W. Smith,
Tedder.

No. 102173.     Patented April 19, 1870.

Witnesses                     Walter Smith
                              by his attorney

United States Patent Office.

WALTER SMITH, OF WESTON, MASSACHUSETTS.

Letters Patent No. 102,173, dated April 19, 1870.

---

IMPROVEMENT IN HAY-TEDDERS.

---

The Schedule referred to in these Letters Patent and making part of the same

---

*To all persons to whom these presents may come:*

Be it known that I, WALTER SMITH, of Weston, of the county of Middlesex and State of Massachusetts, have invented a new and useful Improvement in Hay-Tedders; and do hereby declare the same to be fully described in the following specification, and represented in the accompanying drawing, of which—

Figure 1 denotes a top view, and

Figure 2, an end elevation of a hay-tedder or spreader containing my invention.

Figure 1:
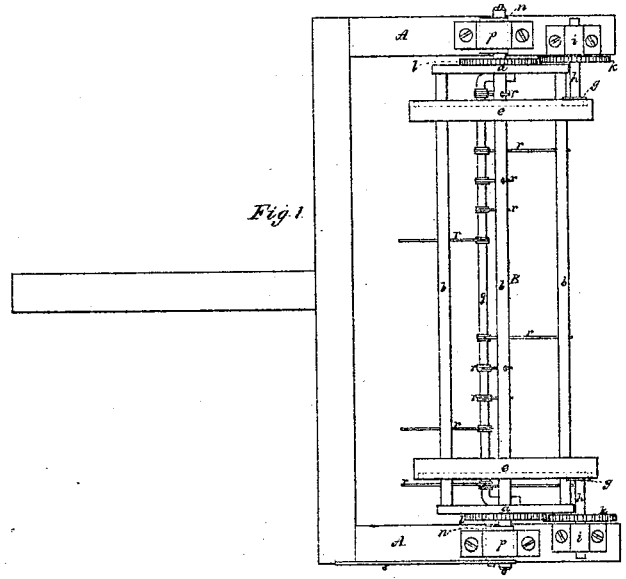
Figure 2:
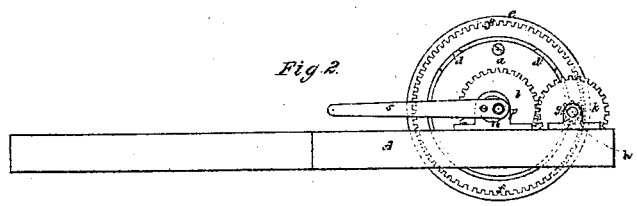
Figure 3:
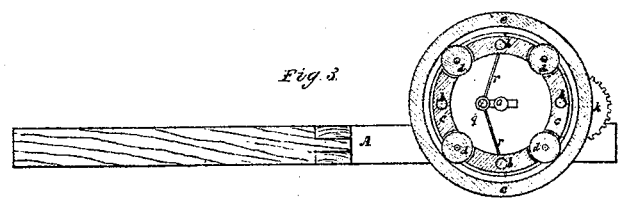
Figure 3 is a transverse section of it taken through the axes of the supporting-wheels.
Figure 4:
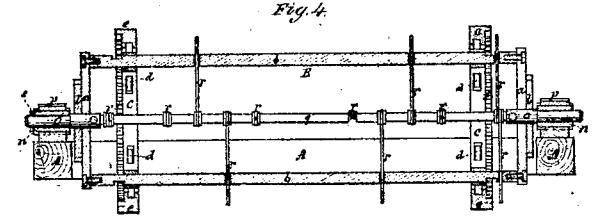
Figure 4 is a longitudinal section of it.

In other hay-tedders the mechanism for spreading the hay is arranged to operate between the sustaining-wheels, in consequence of which they are liable to run over and trample down the hay while on the ground.

In the hay-tedder hereinafter described, the hay-spreading mechanism is arranged to operate on both sides of and beyond each wheel, whereby the hay that may be directly in front of each wheel during an advance of the tedder, instead of being trampled down by the wheels, will be caught up by the arms and thrown over the wheels. Thus the said wheels will move only on a surface free from hay.

Furthermore, there are applied to each of the journals of the supporting crank of the series of hay-spreaders or arms an eccentric, bearing, or box, which, by being revolved within a carrier or box, will move the crank so as to either elevate the arms out of action upon the hay or depress them into action thereupon, as circumstances may require. At the same time the eccentric bearings serve as means of throwing out of engagement the mechanism for revolving the actuating frame of the arms.

In the drawings—

A denotes the frame of the machine.

B is a lantern-frame, composed not only of two circular heads $a$ $a$ and a series of rods, $b$ $b$ $b$ $b$, connecting them, but of two rings, $c$ $c$, arranged between and near the heads, the rods going through such rings.

Each of these rings carries a series of friction rollers, $d$, which is encompassed by and serves to support one of a pair of wheels or sustaining-rings $e$ $e$.

Furthermore, each of the said rings or wheels $e$ has an internal gear, $f$, to engage with one of two pinions $g$ $g$, each of which is carried by one of two short horizontal shafts $h$ $h$, that are duly supported by and in boxes $i$ $i$.

A gear, $k$, on each shaft $h$, engages with one of two gears $l$ $l$ fixed on the heads $a$ $a$.

The lantern-frame B turns freely on a long cranked shaft, $o$, whose journals are arranged in and so as to be capable of turning in eccentrics $n$ $n$.

These eccentrics are arranged to revolve in stationary boxes $p$ $p$, supported by the frame of the machine.

There is disposed on the crank $q$ of the shaft $o$ a series of arms $r$ $r$ $r$, each of which turns on the crank part $q$, and extends and slides freely through one of the bars of the lantern-frame, the whole being arranged in manner as represented in the drawings.

A lever or arm, $s$, fixed to one of the eccentrics $n$ $n$, serves to enable a person to revolve the latter, and thereby, when desirable, pivot the crank $q$ in a posit to elevate all its arms in a manner so as to throw them out of action on the hay or ground while the machine may be in movement over the latter.

By revolving the eccentric we can throw the gears $l$ $l$ out of engagement with the gears $k$ $k$, and thus prevent the wheels, while revolving, from effecting any rotary motion of the lantern-frame B.

When the machine is being drawn along upon a field covered with new-mown hay, the trains of gears connected with the wheels and the lantern-frame will put the latter in revolution, whereby the arms of the cranked shaft will be revolved and forced down upon the hay, and will rake it up and throw it over the wheels and deposit it in rear of them.

I claim as my invention the following, viz:

1. The arrangement of the driving-wheels $e$ $e$ with the lantern-frame B, and the series of arms $r$ applied to the cranked shaft $o$, such frame and arms under such an arrangement being projected outwardly beyond the said wheels $e$ $e$, substantially as set forth.

2. The combination and arrangement of the eccentrics $n$ $n$ with the cranked shaft $o$, its arms $r$, the boxes $p$ $p$, the lantern-frame B, the driving-wheels $e$ $e$, and the gears $f$, $g$, $k$, $l$, or mechanism for revolving the lantern-frame B, by means of the driving-wheels $e$ $e$, as explained.

WALTER SMITH.

Witnesses:
R. H. EDDY,
J. R. SNOW.